United States Patent
Madaiah (10) Patent No.: US 9,544,013 B2
(45) Date of Patent: Jan. 10, 2017

(54) CHANNEL ENCODING BASED ON TEMPORAL SPREADING OF INPUT BLOCK

(71) Applicant: Tejas Networks LTD., Bangalore (IN)

(72) Inventor: Vinod Kumar Madaiah, Bangalore (IN)

(73) Assignee: TEJAS NETWORKS LTD., Bangalore (IN)

(*) Notice: Subject to any disclaimer, the term of this patent is extended or adjusted under 35 U.S.C. 154(b) by 0 days.

(21) Appl. No.: 14/851,519

(22) Filed: Sep. 11, 2015

(65) Prior Publication Data

US 2016/0080028 A1    Mar. 17, 2016

(30) Foreign Application Priority Data

Sep. 12, 2014 (IN) .......................... 4478/CHE/2014

(51) Int. Cl.
*H04B 1/00* (2006.01)
*H04B 1/707* (2011.01)

(52) U.S. Cl.
CPC ..................... *H04B 1/707* (2013.01)

(58) Field of Classification Search
CPC ................................ H04B 1/707; H04B 1/69
USPC ................... 375/130, 147, 262; 370/329
See application file for complete search history.

(56) References Cited

U.S. PATENT DOCUMENTS

| | | | | |
|---|---|---|---|---|
| 2003/0053522 A1* | 3/2003 | Hayoun | ................ | H04L 25/023 375/147 |
| 2004/0120415 A1* | 6/2004 | Song | ...................... | H04L 5/026 375/262 |
| 2010/0201492 A1* | 8/2010 | Koo | ...................... | G06K 7/0008 340/10.1 |
| 2010/0272048 A1* | 10/2010 | Pan | ...................... | H04L 1/1635 370/329 |

* cited by examiner

*Primary Examiner* — Khai Tran
(74) *Attorney, Agent, or Firm* — Mintz Levin Cohn Ferris Glovsky and Popeo, P.C.

(57) ABSTRACT

Aspects of the present disclosure aim at providing a channel encoder configured to implement a temporally spreading coding scheme, wherein each bit of duration 'T' from a block of k bits is spread in time domain to 'k times T' i.e., k*T duration by means of one or more orthogonal codes. In an aspect, orthogonal codes of the present disclosure can be constituted from a sequence of discrete or digital values such that spreading (using convolution operation) and dispreading or concentrating or reconstruction (using de-convolution operation) of transmitted bit is unique and deterministic. Discrete values could be from Gaussian waveform or truncated Gaussian waveform. Digital values could be 1 (one) and 0 (zero).

15 Claims, 6 Drawing Sheets

CHANNEL ENCODING BASED ON TEMPORAL SPREADING OF INPUT BLOCK

CROSS-REFERENCE TO RELATED APPLICATION

This application claims under 35 U.S.C. §119(a) the benefit of Indian Patent Application No. 4478/CHE/2014 filed Sep. 12, 2014, which is incorporated herein in its entirety by reference.

BACKGROUND

Field of Invention

Embodiments of the present disclosure generally relate to transmission of digital information. In particular, the present disclosure relates to a channel encoder configured to transform information sequence into a discrete encoded sequence/codeword.

Description of the Related Art

The background description includes information that may be useful in understanding the present invention. It is not an admission that any of the information provided herein is prior art or relevant to the presently claimed invention, or that any publication specifically or implicitly referenced is prior art.

With increasing popularization of mobile communication, communication services with only voice service can not satisfy the demands for information collection anymore, and mobile data communication service has exhibited huge and promising prospect with its more convenient and more abundant information content e.g. business and entertainment. Therefore, high speed packet access services that support high speed data transmission, especially high speed downlink packet access (HSDPA), and Long Term Evolution (LTE), from a base station to a user terminal, among other technologies, have become one of key targets of future wireless communication systems.

In the operation of a wireless communication system, a transmitter device transmits a signal containing useful data to a receiver device over an air interface. In multiple-input multiple-output (MIMO) wireless communication systems, signals are transmitted over multiple parallel paths by way of multiple transmit antennas and/or multiple receive antennas. A MIMO system takes advantage of the spatial diversity and/or multiplexing provided by multiple parallel antennas to improve the signal-to-noise ratio (SNR) of the combined received signal and increase data throughput without increasing bandwidth usage. MIMO has many benefits including improved spectrum efficiency, improved bit rate and robustness at cell edge, reduced inter-cell and intra-cell interference, improvement in system capacity and reduced average transmit power requirements. Error correcting codes are commonly used in wireless systems to protect against bit errors in received signals caused by channel fading, interference and receiver defects. Typically, an encoder adds redundancy information to user data prior to transmission, and a corresponding decoder is applied to the received signal to recover the original data.

Figure 1:
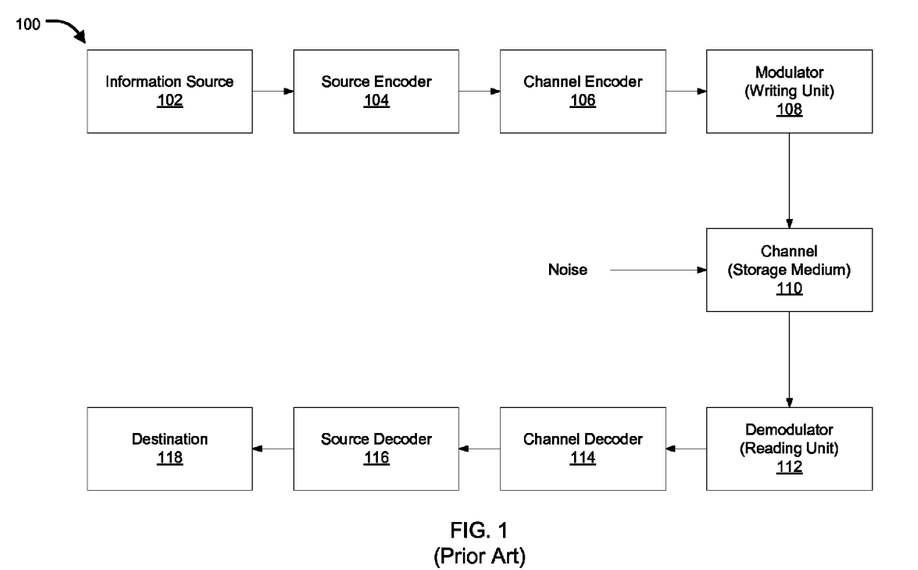
FIG. 1 illustrates an exemplary block diagram showing a typical flow path for transmission/storage of digital information where data transfer can be initiated from an information source to a destination (or user).

FIG. 1 illustrates an exemplary block diagram 100 showing a typical flow path for transmission/storage of digital information, wherein data transfer can be initiated from an information source 102 to a destination 118 (or user). The information source 102 can be either a person or a machine, for example, a digital computer, or a data terminal, wherein source output, which is to be communicated to the destination 118, can be either a continuous waveform or a sequence of discrete symbols. A source encoder 104 can be incorporated in the transmission flow to transform the source output into a sequence of binary digits (bits) referred to as information sequence, which, in case of a continuous source, can involve analog-to-digital (A/D) conversion. The source encoder 104 can be designed such that the number of bits per unit time required to represent the source output is minimized, and the source output can be unambiguously reconstructed from the information sequence.

A channel encoder 106 can also be incorporated to transform the information sequence into a discrete encoded sequence, commonly referred to as a codeword, wherein, in most instances, the encoded sequence is a binary sequence, although in some applications non-binary codes are also used. The codeword can then be sent from a modulator 108 through a channel/storage medium 110 to a demodulator 112, which can pass the codeword to a channel decoder 114 for onward processing by a source decoder 116, and finally sent to the destination 118.

Existing systems and implementations of channel encoder 106 need to combat with a noisy environment in which the codewords must be transmitted or stored, which is a problem that has been not been efficiently and effectively solved as yet. In a communication system, it is actually impossible to receive a transported signal without any distortion or noise. In particular, when the signal is transported/received over a wireless network, the effects of the distortions (e.g. due to multipath, shadowing, etc.) or noises are more serious as compared with when the signal is transported/received over a wired network.

Many efforts have been made to minimize the effects of the distortions or noises. An error control coding technique has been proposed as a typical method of minimizing the effects of the distortions or noises. Codes used for the error control coding technique are classified into memory-less codes, and memory codes, wherein each memory-less code includes a linear block code, while the memory code includes a convolutional code and a turbo code. A device for generating such codes is called a "channel encoder", and its output can be divided into systematic bits and parity bits based on the error control coding technique. The turbo code is a code typically used for the error control coding technique that separates its outputs into the systematic bits and the parity bits. In addition to the turbo code, there exists a systematic convolutional code of the convolutional code as a code used for the error control coding technique. Herein, the "systematic bits" mean an actual transport signal, while the "parity bits" mean a supplemental signal added to correct a possible error, which occurred during transportation in a decoding process. However, even though a signal is subjected to the error control coding, if a burst error occurs in the systematic bits or the parity bits, it is not easy to correct the burst error. Such a phenomenon frequently occurs while the signal passes through a fading channel, and an "interleaving" technique is typically used to prevent this phenomenon. The interleaving technique disperses a damaged part in several places rather than concentrating it on a single place, thereby complementing the error control coding technique.

There is therefore a need in the art to develop a channel encoder that enables efficient handling of noisy environment and improves system performance.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

OBJECTS OF THE INVENTION

It is an object of the present disclosure to provide a channel encoder that enables efficient handling of noisy environment and improves system performance.

It is another object of the present disclosure to provide a channel encoder that is configured to implement a temporally spreading coding scheme.

It is another object of the present disclosure to provide a channel encoder that is configured to implement a temporally spreading coding scheme, wherein each bit of duration 'T' from a block of k bits is spread in time domain to 'k times T' i.e., k*T duration by means of one or more orthogonal codes.

It is another object of the present disclosure to provide a channel encoder that is configured to implement a temporally spreading coding scheme, wherein the orthogonal codes are constituted from a sequence of discrete or digital values such that spreading (using convolution operation) and dispreading or concentrating or reconstruction (using de-convolution operation) of transmitted bit is unique and deterministic.

SUMMARY

Aspects of the present disclosure aim at providing a channel encoder configured to implement a temporally spreading coding scheme, wherein each bit of duration 'T' from a block of k bits is spread in time domain to 'k times T' i.e., k*T duration by means of one or more orthogonal codes. These orthogonal codes are constituted from a sequence of discrete or digital values such that spreading (using convolution operation) and dispreading or concentrating or reconstruction (using de-convolution operation) of transmitted bit is unique and deterministic. Discrete values could be from Gaussian waveform or truncated Gaussian waveform. Digital values could be 1 (one) and 0 (zero).

In an aspect of the present disclosure, channel encoder of the present disclosure receives an input block of say 'k' bits, and creates C number of orthogonal codes, wherein C ≥k, and where the size (number of bits) of each orthogonal code can vary or remain same such that the size is ≥k. In an exemplary aspect, size or length of the orthogonal code, for the purpose of illustration of the present disclosure, can be assumed to be fixed at 'n' for each code, although the same may vary. In an exemplary implementation, once the orthogonal codes are created, each bit of the input block can be processed with all or part of the sequence of a given/selected orthogonal code so as to spread each bit of the input block across 'n' or less number of transmission durations $T_t$, as a result of which 'k' new processed sequences are generated. Magnitude and/or extent of temporal spacing can therefore be controlled by changing the size 'n' of each orthogonal code.

According to one embodiment, the processed and time-spread sequence of bits can be transformed based on defined configuration/pattern, and can then be scaled based on a scaling factor 's'. In an exemplary instance, the step of transformation can include representing bits in anti-podal or bi-podal format such as each '0' bit can be represented as '−1', and each '1' bit can be represented as '+1', or visa-versa. Any other means of transformation can also be included and is well within the scope of the present disclosure. In an exemplary implementation, upon transformation, each transformed bit can be scaled by the scaling factor 's', say by a scaling down factor of 4, wherein each −1 becomes −¼, and each +1 becomes +¼. Scaling factor can be chosen differently for each transmission duration and can be also set at zero for selected transmission duration implying that there is no contribution from the information bit during that transmission duration or interval. An orthogonal code can also be chosen to provide same result. One should further appreciate that although the present example illustrates scaling being performed post transformation, the sequence of actions can always be interchanged. For instance, the scaling can be performed before transforming the processed and time-spread sequence of bits into anti-podal and/or bi-podal formats. Similarly, processing of input block bits with one or more orthogonal codes can also be performed after transformation of the input block bits into anti-podal and/or bi-podal formats, and therefore any such configuration/structure/construction is completely within the scope of the present disclosure.

According to another embodiment, once all the 'k' new transformed sequences are scaled, the modified 'k' sequences can be summed to obtain summed energy for each of the 'k' bits. The summed energy can then be transmitted over the channel and/or to the next networking element.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of implementing a channel encoder, it should be appreciated that the same has been done merely to illustrate the disclosure in an exemplary manner and any other purpose or function for which the explained structure or configuration can be used, is within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named element.

Aspects of the present disclosure aim at providing a channel encoder configured to implement a temporally spreading coding scheme, wherein each bit of duration 'T' from a block of k bits is spread in time domain to 'k times T' i.e., k*T duration by means of one or more orthogonal codes.

In an aspect of the present disclosure, channel encoder of the present disclosure receives an input block of say 'k' bits, and creates C number of orthogonal codes, wherein C ≥k, and where the size (number of bits) of each orthogonal code can vary or remain same such that the size is ≥k. In an exemplary aspect, size of the orthogonal code, for the purpose of illustration of the present disclosure, can be assumed to be fixed at 'n' for each code, although the same may vary. In an exemplary implementation, once the orthogonal codes are created, each bit of the input block can be processed with all bits of a given/selected orthogonal code so as to spread each bit across 'n' number of transmission durations $T_t$, as a result of which 'k' new processed sequences are generated. Magnitude and/or extent of temporal spacing can therefore be controlled by changing the size 'n' of each orthogonal code.

According to one embodiment, the processed and time-spread sequence of bits can be transformed based on defined configuration/pattern, and then be scaled based on a scaling factor 's'. In an exemplary instance, the step of transformation can include representing bits in anti-podal or bi-podal format such as each '0' bit can be represented as '−1' (minus one), and each '1' bit can be represented as '+1' (plus one), or visa-versa. Any other means of transformation can also be included and is well within the scope of the present disclosure. In an exemplary implementation, upon transformation, each transformed bit can be scaled by the scaling factor 's', say by a scaling down factor of 4, wherein each −1 becomes −¼, and each +1 becomes +¼.

According to another embodiment, once all the 'k' new transformed sequences are scaled, the modified 'k' sequences can be summed to obtain summed energy for each of the 'k' bits. The summed energy can then be transmitted over the channel and/or to the next networking element.

Figure 2:
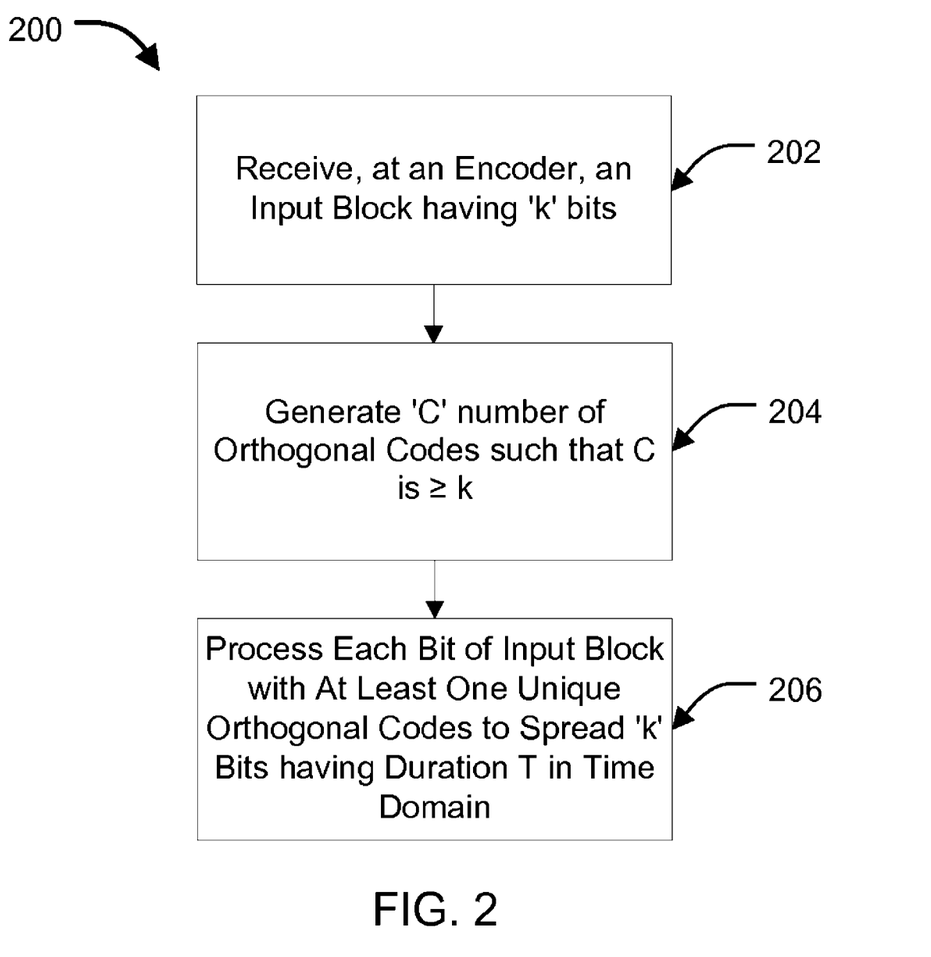
FIG. 2 illustrates an exemplary flow diagram of temporally spreading an input block in accordance with an embodiment of the present disclosure.

FIG. 2 illustrates an exemplary flow diagram 200 of temporally spreading an input block in accordance with an embodiment of the present disclosure. At step 202, channel encoder of the present disclosure can receive an input block having 'k' bits, wherein, at step 204, based on the received input block, 'C' number of orthogonal codes can be generated, wherein C≥k, and where the size (number of bits) of each orthogonal code can vary or remain same such that the size of any orthogonal code is ≥k. At step 206, each bit of the input block can be processed with a given/selected orthogonal code so as to temporally spread the k bits of the input block having duration T per bit in time domain. By means of such transformation, energy of each bit can be spread across timeslots and therefore the temporal spreading codes can be considered to be opposite to frequency-spread codes. Spreading of a single bit across longer time slots also improves resiliency to channel impairments, also resiliency to multipath fading as actual bit duration is spread over n slots. This ensure that bits are not distorted by frequency selective channel. The processed sequence of bits can then be forwarded to the destination or can be further transformed into say anti-podal or bi-podal formats, scaled, and/or summed before being forwarded to the destination.

Figure 3A:
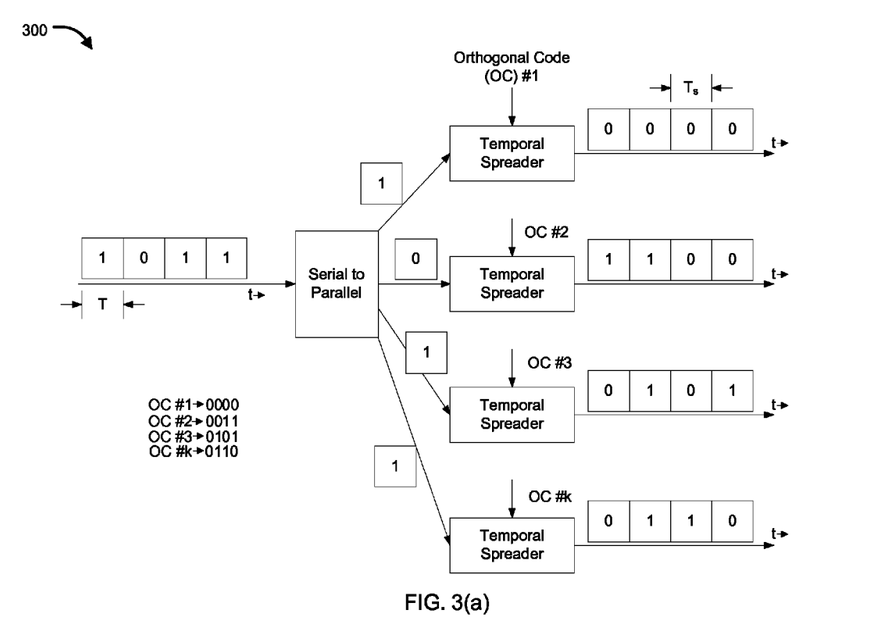
FIGS. 3(a) and 3(b) illustrates exemplary representations showing Encoder for temporal spacing of input block having k bits in accordance with an embodiment of the present disclosure.
Figure 3B:
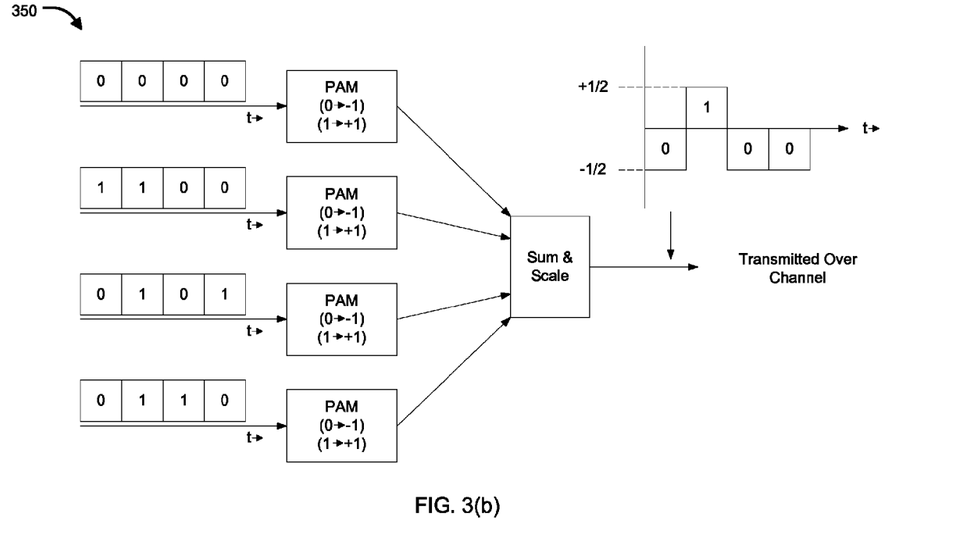

FIGS. 3(a) and 3(b) illustrate exemplary representations 300 and 350 showing encoding process for temporal spacing of input block having k bits in accordance with an embodiment of the present disclosure. As shown, an exemplary input block can be of 4-bit size, wherein the incoming sequence can be say 1011, wherein the incoming sequence can be processed through a serial-to-parallel interface to divide the sequence into individual bits, wherein each bit can then be sent to a temporal spreader so as to spread its time beyond the original duration of $T_s$. A plurality of orthogonal codes shown as OC #1, OC #2, OC #3, and OC #k can accordingly be generated such that the number of codes is ≥k, which in the present case is 4, and also the bit size of each code OC is at least equal to k. In the present illustration, assuming that the size of each orthogonal code is same and equal to 4, each bit of the input sequence can be temporally spread by processing the bit with one of the generated orthogonal codes. For instance, first bit 1 of the input sequence 1011 can be processed with OC #1 (0000) to generate processed sequence as 0000, second bit 0 of the input sequence 1011 can be processed with OC #2 (0011) to generate processed sequence as 1100, third bit 1 of input sequence 1011 can be processed with OC #3 (0101) to generate processed sequence as 0101, and fourth bit 1 of input sequence 1011 can be processed with OC #k (0110) to generate processed sequence as 0110. In case the number of orthogonal codes is greater than 4, the codes can be selected at random or based on defined configurations/algorithms. For simplicity, the example shows Orthogonal codes as digital values and not as discrete values.

With reference to FIG. 3(b), in an exemplary implementation, the processed output sequence obtained from FIG. 3(a) by processing of orthogonal codes with each bit of the input block, can be transformed based on say anti-podal or bi-podal formats, wherein, in an instance, 0 can be represented as −1, and 1 can be represented as +1. Any other transformation format such as visa-versa of above-mentioned format is completely within the scope of the present disclosure. Therefore, the first sequence 0000 can be transformed into −1 −1 −1 −1, second sequence 1100 can be transformed into +1 +1 −1 −1, and so on for all the four processed sequences, so as to obtain four transformed sequences. Upon transformation, the sequences can then be scaled by means of scaling factor say a scaling down factor of 4, such that the transformed sequence −1 −1 −1 −1 now becomes −¼ −¼ −¼ −¼ and the transformed sequence +1 +1 −1 −1 now becomes +¼ +¼ −¼ −¼. In an exemplary embodiment, such scaling factor can be determined so as to get maximum voltage/power per bit value to 1.

According to one embodiment, upon generation of the modified scaled sequences of transformed bits, the modified scaled sequences can be summed to generate a final bit sequence that can be transmitted to the destination or to the next channel.

Figure 4:
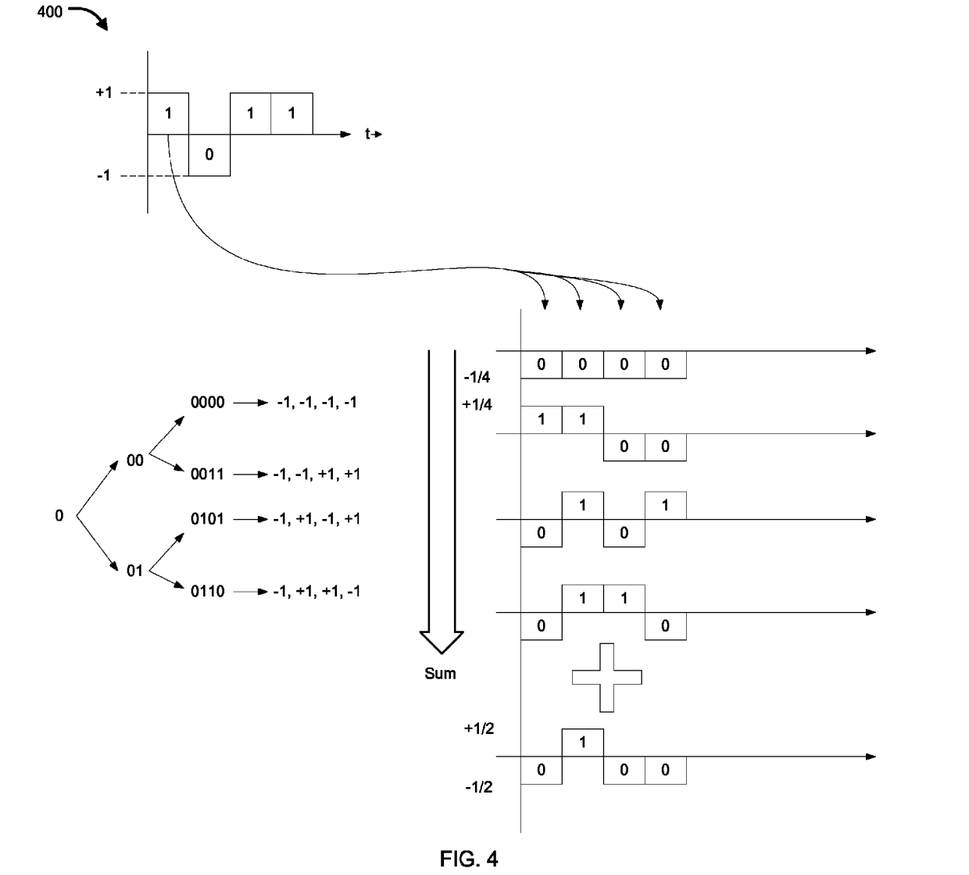
FIG. 4 illustrates an exemplary representation of orthogonal-coding based temporal spreading in accordance with an exemplary embodiment of the present disclosure.

FIG. 4 illustrates an exemplary representation 400 of orthogonal-coding based temporal spreading in accordance with an exemplary embodiment of the present disclosure. With reference to the same example as FIGS. 3(a) and 3(b), number of bits, k, also referred to as an input block of (information) bits that are to be encoded can initially be received by the channel encoder of the proposed system. As was the case for FIG. 3, the figure block size has been assumed to be k=4 bits.

In an exemplary implementation, orthogonal codes of size n≥k can be created, wherein these codes can be numbered numerically and/or or sequentially for convenience. Number of such codes must be at least equal to k=4. As shown in FIG. 4, four orthogonal codes (0000, 0011, 0101, and 0110) of size n=4 (that is, the number of bits per code is 4) have been configured, wherein the size of each code has been shown to be same for simplicity of the disclosure and as mentioned above, has to be kept more than 4 (n>k) for better channel performance or error correction capability.

According to another embodiment, each bit in the input block can be converted into bi-podal or anti-podal form by transforming 0 to −1 and 1 to +1. It is also possible to map 0 to +1 and 1 to −1. The orthogonal codes can also be converted to bi-podal form by transforming 0 to −1 and 1 to +1. It may also be preferable to follow the same mapping convention as for block of information bits. In an implementation, after the above transformation, each bit from the block of k bits can be multiplied with each bit of a chosen orthogonal code, and therefore spread across 'n' number of transmission duration Tt, wherein the value of Tt can be different than information bit duration, T. Each bit of k-bit input block can therefore be processed with an orthogonal code chosen for that bit. In FIG. 4, first bit of the input block is shown +1 in anti-podal format. This value +1 can therefore be multiplied with first bit of the first orthogonal code in anti-podal format, that is, −1. The resultant value (+1 multiplied by −1 is −1) can be scaled down by some pre-configured scaling factor, say s, which, in the FIG. 4 has been set to as 4. This scaled resultant, which is −¼ can be associated with the first transmission position as shown in the figure. In similar fashion, the same bit (+1) of the input block can then multiplied with second bit of the first orthogonal code in anti-podal format, that is, −1. The resultant value, −1 can similarly be scaled to −¼ and associated with second transmission position as shown in the figure. This multiplication can be continued between all remaining bits of the orthogonal code in anti-podal format and the first bit of the input block, which is referred to as temporal spreading of bit by orthogonal codes.

Once the processing of the first bit of the input block is complete, second bit of the input block in anti-podal format, −1, can be spread by multiplying each of the orthogonal codes in anti-podal format to get +1, +1, −1, −1 (that is, −1*−1=+1, −1*−1=+1, −1*+1=−1, −1*+1=−1). Therefore, after scaling we get +¼, +¼, −¼, −¼, which can be associated and aligned with corresponding transmission positions of first information bit in anti-podal format as shown in FIG. 4. The same process can be repeated for the remaining two information bits (+1, +1) of the input block. In an implementation, energy per slot due to all k bits can be added or summed, wherein the first slot has energy −¼, ¼, −¼, −¼, which, on addition, gives −½. Other slots give +½, −½ and −½. The summed energy can be transmitted over the channel or to the next networking element, if any, in tandem. In order to have non-zero summed energy, scaling factor, orthogonal codes, etc. are wisely configured and chosen.

Figure 5:
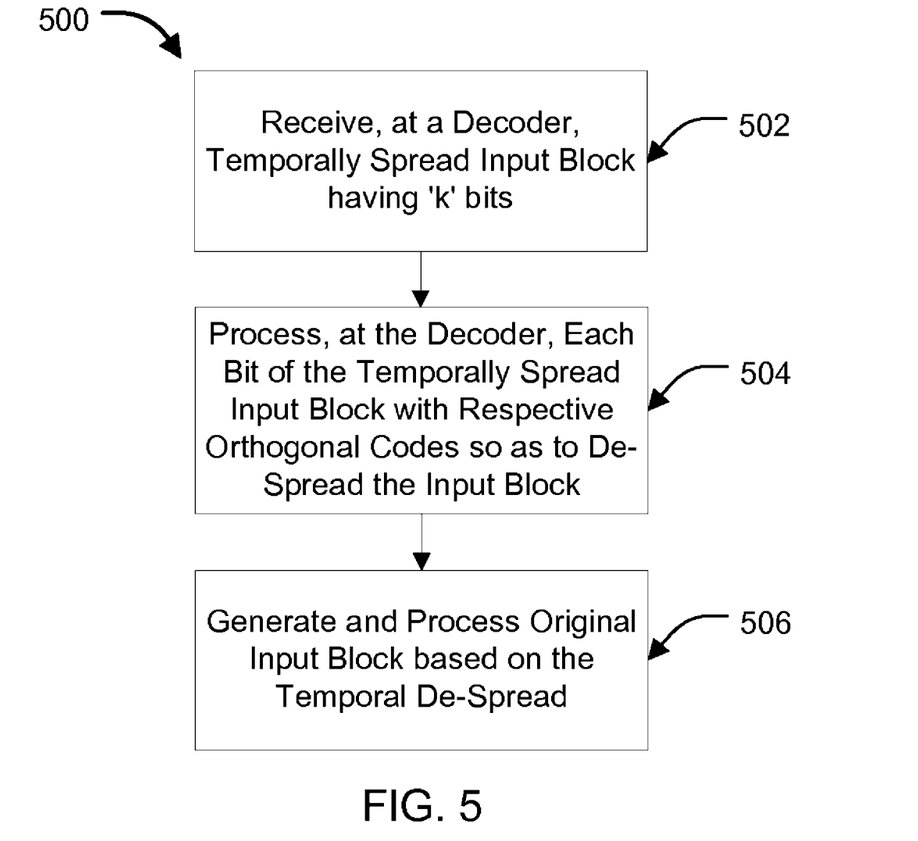
FIG. 5 illustrates an exemplary flow diagram for decoding a received input sequence that is temporally spread in accordance with an embodiment of the present disclosure.

FIG. 5 illustrates an exemplary flow diagram 500 for decoding a received input sequence that is temporally spread in accordance with an embodiment of the present disclosure. As shown, at step 502, the decoder can receive a temporally spread input block having 'k' bits, wherein at step 504, the decoder can process each bit of the temporally spread input block with the orthogonal code that the bit was originally processed with so as to de-spread the input block. At step 506, such de-spreading can be used to retrieve back the original input block based on the processing outcome of the received input block and the bit-corresponding orthogonal sequences.

Figure 6A:
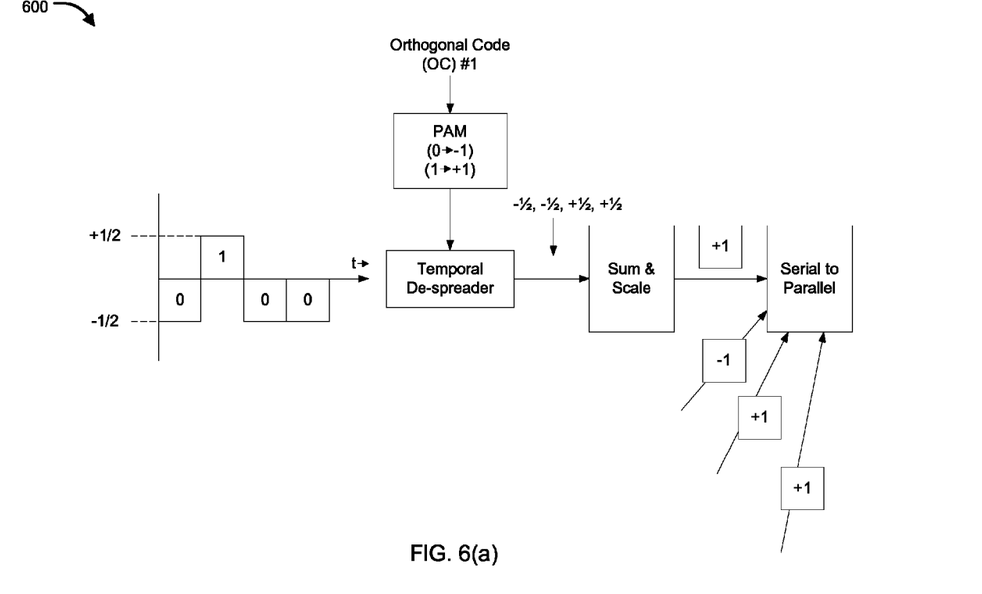
FIGS. 6(a) and 6(b) illustrate exemplary representations showing the decoding process using temporal de-spreading in accordance with an embodiment of the present disclosure.
Figure 6B:
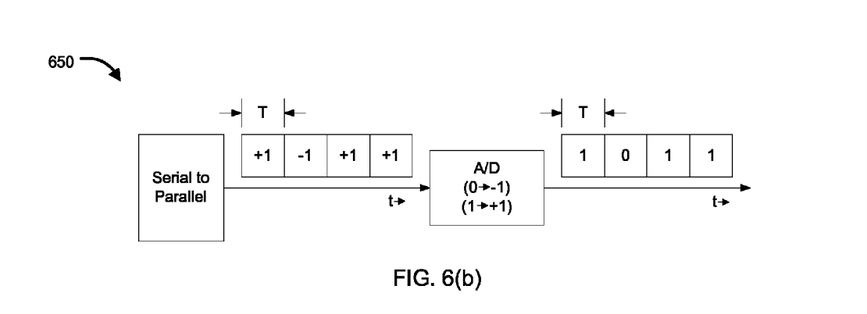

FIGS. 6(a) and 6(b) illustrate exemplary representations 600 and 650 respectively showing the decoding process using temporal de-spreading in accordance with an embodiment of the present disclosure. As shown, the received temporally spread input 0100 represented as −½ +½ −½ −½ (which was obtained as summed output of the scaled transformation sequence during the encoding process), can be processed by means of a temporal de-spreader 602 based on the transformed orthogonal codes that were used during the encoding process. For instance, as four orthogonal codes OC #1, OC #2, OC #3, and OC #k, were used during the encoding process, the same orthogonal codes can first be transformed into anti-podal format as shown in 604, and then input to the temporal de-spreader so as to obtain a summed/scaled version of the original input block, which can then be processed through a reverse-scaling process and passed through a serial-to-parallel interface 606 to obtain +1 −1 +1 +1 as the transformed output, as shown in FIG. 6(b). Anti-podal format base processing can then be done on the transformed output, as shown in FIG. 6(b), to retrieve the original input block 1011 that was sent by the transmitter.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claim.

ADVANTAGES OF THE INVENTION

The present disclosure provides a channel encoder that enables efficient handling of noisy environment and improves system performance.

The present disclosure provides a channel encoder that is configured to implement a temporally spreading coding scheme.

The present disclosure provides a channel encoder that is configured to implement a temporally spreading coding scheme, wherein each bit of duration 'T' from a block of k bits is spread in time domain to 'k times T' i.e., k*T duration by means of one or more orthogonal codes.

The present disclosure provides a channel encoder that is configured to implement a temporally spreading coding scheme, wherein the orthogonal codes are constituted from a sequence of discrete or digital values such that spreading (using convolution operation) and dispreading or concentrating or reconstruction (using de-convolution operation) of transmitted bit is unique and deterministic.

What is claimed is:

1. A method for encoding an input block having 'k' bits comprising the steps of:
   generating 'C' number of orthogonal codes by a channel encoder, wherein 'C' is at least equal to 'k', and wherein size of each orthogonal code is at least equal to 'k'; and
   processing each bit of 'k' bits of said input block with an orthogonal code selected from said 'C' number of orthogonal codes in order to temporally spread said input block and generate temporally spreaded codeword.

2. The method of claim 1, wherein the step of processing of said each bit of 'k' bits of said input block with said orthogonal code comprises multiplying said each bit of 'k' bits of said input block with each sample of said orthogonal code to generate temporally spreaded sequence for said each bit of 'k' bits of said input block.

3. The method of claim 2, wherein 'k' temporally spreaded sequences are transformed using one or a combination of anti-podal or bi-podal format to obtain transformed temporally spreaded sequences.

4. The method of claim 3, wherein said transformed temporally spreaded sequences are summed to obtain said temporally spreaded codeword to be transmitted.

5. The method of claim 3, wherein said transformed temporally spreaded sequences are scaled by a scaling factor and summed to obtain said temporally spreaded codeword to be transmitted.

6. The method of claim 1, wherein the step of processing comprises:
   transforming, using one or a combination of anti-podal or bi-podal format, said 'k' bits of said input block and said orthogonal codes;
   multiplying each transformed bit of 'k' bits of said input block with transformed bits of corresponding orthogonal code to generate temporally spreaded sequence for said each bit of 'k' bits of said input block;
   scaling, by a scaling factor, said temporally spreaded sequence for said each bit of 'k' bits of said input block; and
   summing said scaled temporally spreaded sequence for said each bit of 'k' bits of said input block to obtain said temporally spreaded codeword to be transmitted.

7. A channel encoder for encoding an input block having 'k' bits, said encoder configured to generate 'C' number of orthogonal codes, wherein 'C' is at least equal to 'k', and wherein size of each orthogonal code is at least equal to 'k', and wherein said encoder is further configured to process each bit of 'k' bits of said input block with an orthogonal code selected from said 'C' number of orthogonal codes in order to temporally spread said input block and generate temporally spreaded codeword.

8. The encoder of claim 7, wherein said encoder is further configured to, during processing of said each bit of 'k' bits of said input block with said orthogonal code, multiply said each bit of 'k' bits of said input block with bits of said orthogonal code to generate temporally spreaded sequence for said each bit of 'k' bits of said input block.

9. The encoder of claim 8, wherein 'k' temporally spreaded sequences are transformed using one or a combination of anti-podal or bi-podal format to obtain transformed temporally spreaded sequences.

10. The encoder of claim 9, wherein said transformed temporally spreaded sequences are summed to obtain said temporally spreaded codeword to be transmitted.

11. The encoder of claim 10, wherein said transformed temporally spreaded sequences are scaled by a scaling factor and summed to obtain said temporally spreaded codeword to be transmitted.

12. A communication system comprising an encoder at transmitter end for encoding an input block having 'k' bits, said encoder configured to generate 'C' number of orthogonal codes, wherein 'C' is at least equal to 'k', and wherein size of each orthogonal code is at least equal to 'k', and wherein said encoder is further configured to process each bit of 'k' bits of said input block with an orthogonal code selected from said 'C' number of orthogonal codes in order to temporally spread said input block and generate temporally spreaded codeword to be transmitted to a receiving end.

13. The communication system of claim 12, wherein the system further comprises a decoder configured to receive the temporally spread input block having 'k' bits, wherein each bit of the temporally spread input block is processed with the orthogonal codes so as to de-spread the input block to retrieve back the input block based on the processing outcome of the received temporally spread input block and the orthogonal codes.

14. The communication system of claim 12, wherein the orthogonal codes are constituted from a sequence of discrete values such that spreading and dispreading of transmitted bit is unique and deterministic.

15. The communication system of claim 14, wherein the discrete values are from Gaussian waveform or truncated Gaussian waveform.

* * * * *